UNITED STATES PATENT OFFICE.

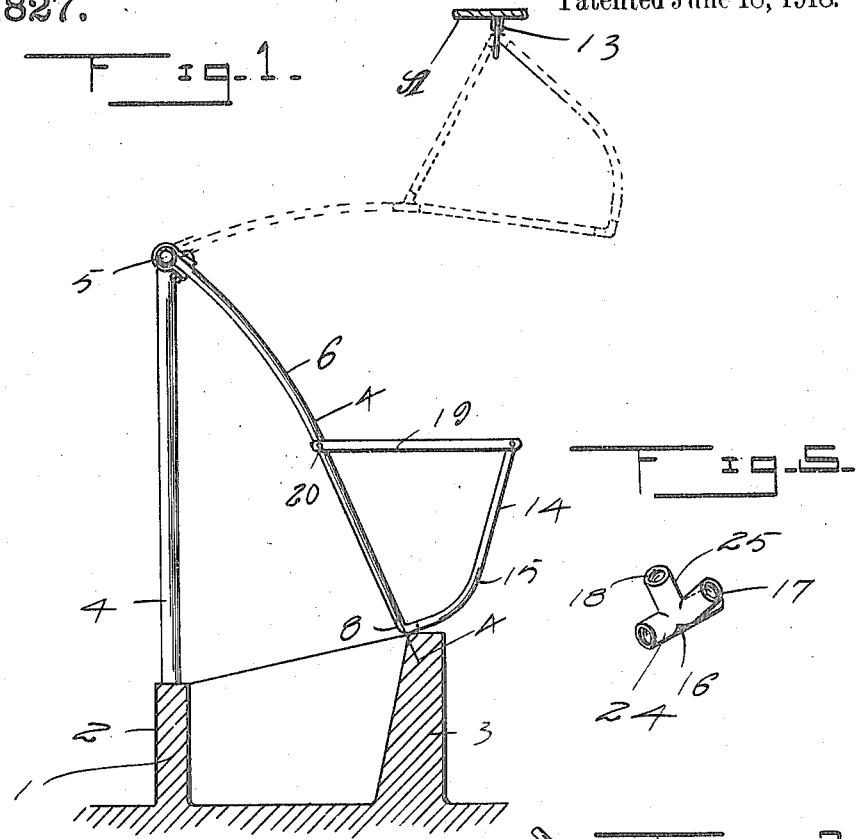
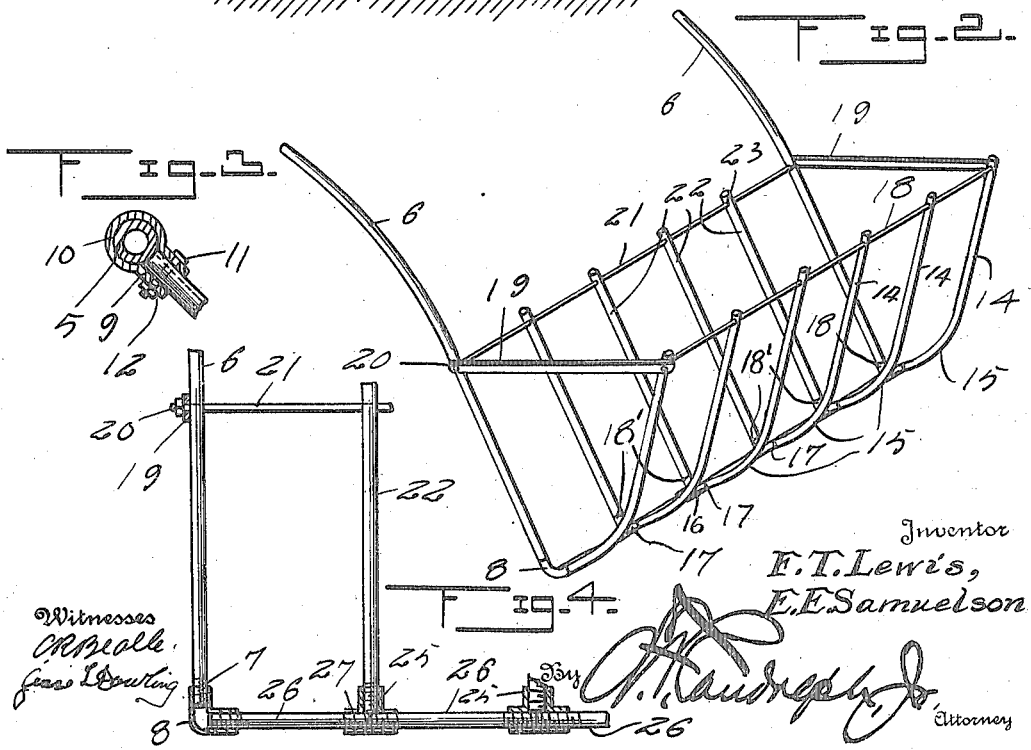

FREDRICK T. LEWIS AND ELMER EMANUEL SAMUELSON, OF CHIPPEWA FALLS, WISCONSIN.

FEEDING-RACK.

1,269,827.  Specification of Letters Patent.  Patented June 18, 1918.

Application filed June 20, 1917.  Serial No. 175,869.

*To all whom it may concern:*

Be it known that we, 1, FREDRICK T. LEWIS, 2, ELMER EMANUEL SAMUELSON, citizens of the United States, residing at Chippewa Falls, in the county of Chippewa and State of Wisconsin, have invented certain new and useful Improvements in Feeding-Racks; and we do hereby declare the following to be a full, clear, and exact description of the invention, such as will enable others skilled in the art to which it appertains to make and use the same.

This invention relates to improvements in feeding racks.

The object of this invention is the provision of a rack, which may be rotatably supported to the stanchion supporting member of a stable so that the frame may be raised upwardly and removably secured to the ceiling when not in use, and may be lowered to rest upon the forward wall of the feeding trough so that an animal placed within the stall may eat with ease and at the same time the rack affords sufficient space so that the animal may hold up his head while eating.

A still further object of this invention is to provide a rack, which is rotatably mounted on the frame in a stall and is so arranged that it may rest upon the upper edge of the trough so that an animal may eat the alfalfa therefrom in a quick and reliable manner.

A still further object of this invention is to provide a feeding rack of this character, which will be simple, practical and comparatively inexpensive in construction and one that can be manufactured and sold at a low cost.

With these and other objects in view, the invention consists in the novel combination and arrangement of parts hereinafter more fully described and set forth in the claim hereto appended.

In the drawing:

Figure 1 is a view illustrating the manner in which the rack is rotated upon the horizontal bar of the stanchion supporting frame and the manner in which it rests upon the forward wall of the trough, also illustrating the manner in which the rack may be raised to be supported when not in use, Fig. 2 is a perspective view of the rack, Fig. 3 is a detail sectional view of the manner in which the rack is journaled on the horizontal bar of the frame, Fig. 4 is a sectional view taken on the line 4—4 of Fig. 1, Fig. 5 is a perspective view of one of the intermediate couplings.

Like numerals of reference designate corresponding parts in all the figures of the drawings.

Referring to the drawings, the numeral 1 designates a trough, which has a rear wall 2 and the upwardly and outwardly inclined front wall 3 and secured to the upper edges of the rear wall is a supporting frame 4 and horizontal connecting bar 5, to which our improved rack is adapted to be rotatably and removably secured.

Our improved rack comprises in its construction, a pair of spaced arcuate supporting members 6, which have one of their ends provided with exterior screwthreads 7, to which is secured, one end of the T-couplings 8. The opposite ends of the supporting members are adapted to be removably secured between the spaced arms 9 of the clamping rings 10 by a suitable bolt 11, which extends transversely through the arms 9 and ends of the supporting members and has fitted on one end the nut 12, which facilitates the removable securing of the arcuate supporting members to the rings 10. The rings 10 are rotatably mounted on the horizontal bar 5 of the frame so as to permit the rack to be raised upwardly when not in use and supported to the ceiling designated A in the drawings by a suitable hook 13, which depends downwardly therefrom and is adapted to removably support the rack in its raised position.

The body of the rack comprises a plurality of spaced pipes 14, which have their lower ends curved inwardly as at 15 and the end pipes are threaded in the ends of the T-couplings 8, and the intermediate pipes 14 are removably threaded in one bore of four-way couplings 16, as at 17. A horizontal front rod 18 extends transversely through the upper ends of the members 14 and projects laterally beyond the outer sides of the end members 14 and has secured thereto, the side rails 19, which have their free ends secured as at 20 to the outer sides of the arcuate supporting members 6 centrally thereof by horizontal rear rod 21 as shown in Fig. 2. The members 19 constitute the sides of the rack when the device is in assembly.

A plurality of spaced pipes 22 are arranged on the horizontal rods 21 as at 23 and have their lower ends removably fitted in the four-way couplings 16 as at 18'.

The four-way couplings 16 have the horizontal portions 24 and have formed integrally with the upper sides, the diverging bodies 25, which are adapted to receive the ends of the rear rods 21 and front rods 14 as shown in Fig. 2.

A plurality of pipe sections 26 are removably fitted in the horizontal ends of the bodies of the four-way couplings 16 as at 27 and shown in Fig. 4, thus the rack is complete in its assembly.

In assembling the device, it is to be understood that the rack is composed of a plurality of pipe sections, the arcuate supporting members carry the end T-shaped couplings 8, the end members 14 are threaded in the T-couplings 8, then the members 14 are suspended from the bars 18 and have their lower ends arranged in one of the diverging bores of the four-way couplings 16, the rear pipes are suspended from the bars 21 and have their lower ends removably fitted in the other diverging member of the four-way couplings 16. The ends of the supporting bars are arranged in the clamping rings 10 and the clamping rings are journaled on the horizontal bar 5 and the device is ready for use. When the device is in its lowest position, the sectional pipes 26 and couplings 16 rest upon the upper edge of the inclined front wall 3 of the trough, thus the animal positioned in the stall can easily pull the feed from the trough as desired. When it is desired, after the animals have finished eating, it is only necessary to raise the trough upwardly and place the hook 13 under one of the end rails 19 to support the rack in its raised position.

What is claimed is:

In combination, a base, a trough secured to the upper side of the base, an inverted U-shaped frame secured to the trough by the ends of its arms adjacent the rear portion of the trough, and a rack journaled to the web of the frame and adapted to rest upon the upper edge of the trough when in operative position, and means for holding the rack in raised position, as and for the purpose specified.

In testimony whereof we affix our signatures in presence of two witnesses.

FREDRICK T. LEWIS.
ELMER EMANUEL SAMUELSON.

Witnesses:
NELS HAKENSTROM,
ELLEN C. HAKENSTROM.